Draper, Sweetland & Draper.
Imitating Cluster Jewelry.
Nº 75393    Patented Mar. 10, 1868

Witnesses.
George E. Fisher
H. W. Draper

Inventors.
W. C. Draper
Albert C. Sweetland
G. H. Draper

United States Patent Office.

WILLIAM O. DRAPER, ALBERT C. SWEETLAND, AND GEORGE H. DRAPER, OF NORTH ATTLEBORO, MASSACHUSETTS.

*Letters Patent No. 75,393, dated March 10, 1868.*

MODE OF IMITATING CLUSTER-JEWELRY.

*The Schedule referred to in these Letters Patent and making part of the same.*

TO ALL WHOM IT MAY CONCERN:

Be it known that we, WILLIAM O. DRAPER, ALBERT C. SWEETLAND, and GEORGE H. DRAPER, all of North Attleboro, in the county of Bristol, and State of Massachusetts, have invented a new and useful Improvement in the Method of Making Imitation Cluster-Jewelry; and we do hereby declare that the following specification, taken in connection with the drawings making a part of the same, is a full, clear, and exact description thereof.

Figure 3:

Figure 3 exhibits a specimen of the finished article.

Heretofore "cluster-work," or that style of jewelry which, in the form of breast-pins, buttons, ear-rings, &c., consists of an aggregation of small stones arranged in a cluster, has, in the case of imitation jewelry, as in that which is genuine, been made by mounting each stone, or its glass imitation, in an appropriate plate, furnished with as many settings as there are stones, each stone being held in the grasp of its appropriate setting by the friction of the edge of the latter against the surface of the stone.

In the manufacture of genuine work this method is the only one practicable, on account of the small size and high value of the jewels employed. In imitation-work, where colored glass, in place of precious stones, is employed, the method of constructing which is the subject of the patent can be employed, and the object of which is to produce an article which shall have at least the merit of excelling the ornament which it counterfeits in point of durability and strength.

Figure 1:
Figure 1 represents a perforated plate, which, when combined with the stone, will form the apparent setting.
Figure 2:
Figure 2 represents the form in which the colored glass imitating the stones is prepared.

Instead of making use of separate "stones," as the colored glass used for the purpose is called, we employ a glass disk of any desired hue, the top surface of which is furnished with bosses of the same material, arranged of any size and according to any pattern suitable for the intended article. A specimen of this bossed plate is shown at fig. 2, and the same, and others of any pattern, can be readily moulded by glass-workers. In place of the setting heretofore used, we employ a perforated cap, fig. 1, which may be of very thin sheet metal. It should have its edge turned over to form a rim, so as to admit of its being burnished against the edge of the glass plate, or to be soldered to the back-plate if a back-plate of metal is used. The perforations in the plate should correspond in form with the base outline of the bosses, and should be arranged in the same pattern. This perforated plate can readily be made by means of dies and formers of proper shape operated in a jeweller's press, as is well understood.

The article is completed by placing the plate over the glass disk, fig. 2, so that the bosses upon the latter will protrude through the perforations, and by burnishing the wire against the edge, or soldering it to the back plate, as before stated. The attachments necessary to make the article into a button, breast-pin, or other article, can now be added, as in other cases.

Not only, by the method of making the article described, is it impossible for any one of the stones forming the cluster to become detached, but the cost of making it is very much less than the cost of making the same article in the old way.

What we claim as our invention, and desire to secure by Letters Patent, is—

The method of constructing cluster-work jewelry, substantially as herein described.

W. O. DRAPER,
ALBERT C. SWEETLAND,
G. H. DRAPER.

Witnesses:
GEORGE E. FISHER,
H. W. DRAPER.